(12) United States Patent
Di Benedetto et al.

(10) Patent No.: US 11,053,021 B2
(45) Date of Patent: Jul. 6, 2021

(54) UNMANNED AERIAL VEHICLE AND METHOD FOR INDICATING A LANDING ZONE

(71) Applicant: Drone Delivery Canada Corp., Vaughan (CA)

(72) Inventors: Paul Di Benedetto, Vaughan (CA); Gregory Colacitti, Vaughan (CA)

(73) Assignee: DRONE DELIVERY CANADA CORP., Vaughan (CA)

( * ) Notice: Subject to any disclaimer, the term of this patent is extended or adjusted under 35 U.S.C. 154(b) by 0 days.

(21) Appl. No.: 15/796,214

(22) Filed: Oct. 27, 2017

(65) Prior Publication Data

US 2019/0127083 A1 May 2, 2019

(51) Int. Cl.
| | | |
|---|---|---|
| *B64D 47/06* | (2006.01) | |
| *B64D 45/08* | (2006.01) | |
| *B64D 47/08* | (2006.01) | |

(52) U.S. Cl.
CPC .............. *B64D 47/06* (2013.01); *B64D 45/08* (2013.01); *B64D 47/08* (2013.01); *B64C 2201/127* (2013.01); *B64C 2201/18* (2013.01)

(58) Field of Classification Search
CPC ................ G05D 1/0676; G05D 1/0011; B64C 2201/141; B64C 2201/145
USPC ................................................. 340/981, 982
See application file for complete search history.

(56) References Cited

U.S. PATENT DOCUMENTS

| | | |
|---|---|---|
| 7,584,071 B2 | 9/2009 | Lee |
| 7,999,698 B2 * | 8/2011 | Annati .................... B64D 47/06 244/24 |
| 8,106,748 B2 | 1/2012 | Lee |
| 8,948,935 B1 | 2/2015 | Peeters et al. |
| 9,051,043 B1 | 6/2015 | Peeters et al. |
| 9,056,676 B1 | 6/2015 | Wang |
| 9,120,568 B2 | 9/2015 | Herman et al. |
| 9,174,733 B1 | 11/2015 | Burgess et al. |
| 9,244,147 B1 | 1/2016 | Soundararajan et al. |
| 9,302,783 B2 | 4/2016 | Wang |
| 9,305,280 B1 | 4/2016 | Berg et al. |

(Continued)

FOREIGN PATENT DOCUMENTS

| | | |
|---|---|---|
| DE | 102014105583 A1 | 10/2015 |
| DE | 102014213023 A1 | 1/2016 |

(Continued)

OTHER PUBLICATIONS

Periphery Definition and More, Merriam Webster Dictionary, WayBackMachine Internet Archive Capture, Feb. 20, 2010.*

(Continued)

*Primary Examiner* — Emily C Terrell

(74) *Attorney, Agent, or Firm* — Bereskin & Parr LLP/S.E.N.C.R.L., S.R.L.

(57) ABSTRACT

An unmanned aerial vehicle (UAV) has: a body for carrying an article; at least one rotor; and a light source for generating a light beam to indicate the landing zone for the UAV. The UAV, in use, is flown to a desired location, that might be a site of an emergency with no defined landing zone. The UAV descends, and, while descending the light source is operated to illuminate and to define a landing zone. The UAV can be provided with lights and an audio source to warn and advise bystanders that the UAV is landing and to stand clear of the landing zone.

19 Claims, 3 Drawing Sheets

(56) References Cited

U.S. PATENT DOCUMENTS

| | | |
|---|---|---|
| 9,334,052 B2 | 5/2016 | Pasko et al. |
| 9,384,668 B2 | 7/2016 | Raptopoulos et al. |
| 9,387,928 B1 | 7/2016 | Gentry et al. |
| 9,429,953 B1 | 8/2016 | Miller et al. |
| 9,527,605 B1 | 12/2016 | Gentry et al. |
| 9,573,684 B2 | 2/2017 | Kimchi et al. |
| 9,536,216 B1 | 3/2017 | Lisso |
| 9,629,220 B2* | 4/2017 | Panopoulos ............ F21V 14/02 |
| 9,845,165 B2* | 12/2017 | Michalski et al. |
| 2005/0154653 A1 | 7/2005 | Jongebloed |
| 2011/0264311 A1 | 10/2011 | Lee et al. |
| 2012/0044710 A1* | 2/2012 | Jones .................... B64C 39/024 |
| | | 362/470 |
| 2012/0143482 A1 | 6/2012 | Goossen et al. |
| 2013/0314502 A1* | 11/2013 | Urbach .................. H04N 7/181 |
| | | 348/46 |
| 2014/0032034 A1 | 1/2014 | Raptopoulos et al. |
| 2014/0233099 A1* | 8/2014 | Stark ....................... G09F 21/06 |
| | | 359/446 |
| 2015/0120094 A1 | 4/2015 | Kimchi et al. |
| 2015/0158587 A1 | 6/2015 | Patrick et al. |
| 2015/0336669 A1 | 11/2015 | Kantor et al. |
| 2015/0339933 A1 | 11/2015 | Batla et al. |
| 2015/0353195 A1 | 12/2015 | Peeters et al. |
| 2015/0370251 A1 | 12/2015 | Siegel et al. |
| 2015/0379874 A1 | 12/2015 | Ubhi et al. |
| 2016/0001883 A1 | 1/2016 | Sanz et al. |
| 2016/0016664 A1 | 1/2016 | Basuni |
| 2016/0033966 A1 | 2/2016 | Farris et al. |
| 2016/0041628 A1* | 2/2016 | Verma ................... G06F 3/0304 |
| | | 345/156 |
| 2016/0083073 A1* | 3/2016 | Beckman ................. G09F 9/33 |
| | | 40/463 |
| 2016/0122038 A1 | 5/2016 | Fleischman et al. |
| 2016/0163204 A1 | 6/2016 | Raptopoulos et al. |
| 2016/0200438 A1 | 7/2016 | Bokeno et al. |
| 2016/0284221 A1 | 9/2016 | Hinkle et al. |
| 2016/0304217 A1* | 10/2016 | Fisher ................. B60L 11/1809 |
| 2017/0138732 A1* | 5/2017 | Pettersson ............. B64C 39/024 |
| 2017/0221394 A1* | 8/2017 | Garcia Morchon .. F21V 3/0445 |
| 2017/0313439 A1* | 11/2017 | Holt et al. |

FOREIGN PATENT DOCUMENTS

| | | |
|---|---|---|
| WO | 2015061008 A1 | 4/2015 |
| WO | 2015175242 A1 | 11/2015 |
| WO | 2015168573 A1 | 2/2016 |
| WO | 2016019242 A1 | 2/2016 |
| WO | 2016037219 A1 | 3/2016 |
| WO | 2016094067 A1 | 6/2016 |

OTHER PUBLICATIONS

DRONENET The next BIG thing. Global Guerrilas. Wednesday, Jan. 2, 2013.

International Search Report and Written Opinion dated Jan. 22, 2019 in respect of PCT/CA2018/051360.

* cited by examiner

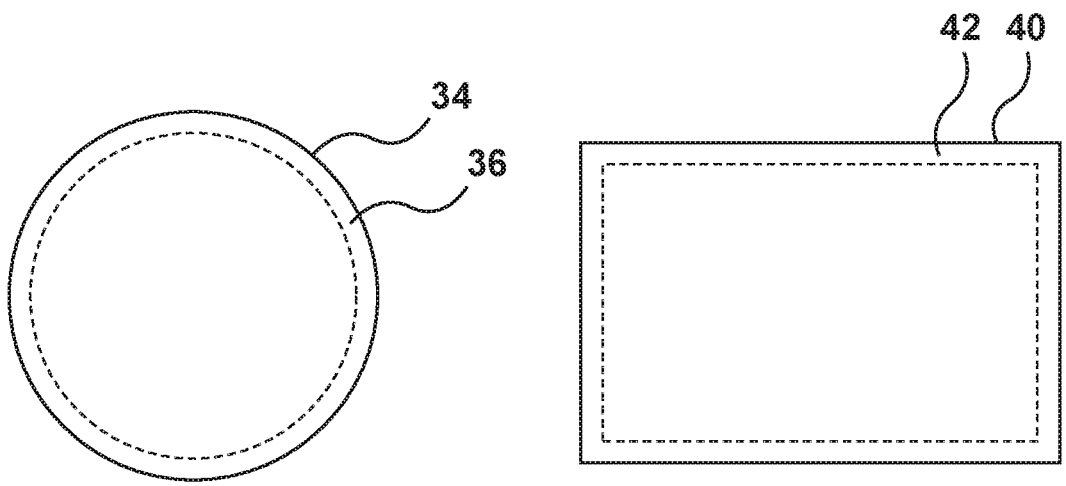
FIG. 3A
FIG. 3B
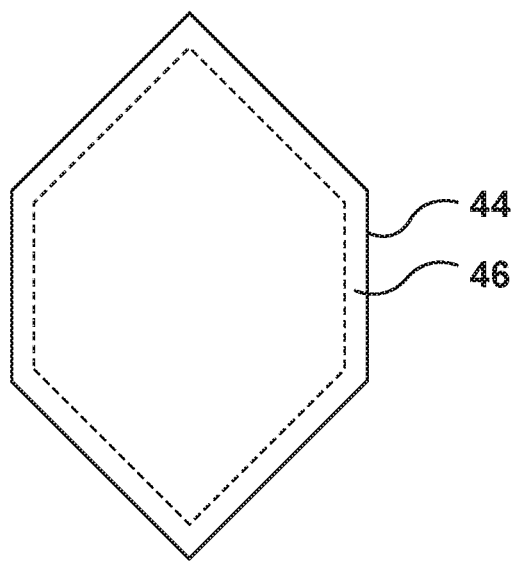
FIG. 3C

UNMANNED AERIAL VEHICLE AND METHOD FOR INDICATING A LANDING ZONE

FIELD

The present disclosure relates to unmanned aerial vehicles, and more particularly to a method and system for delivery of emergency supplies by an unmanned aerial vehicle.

CROSS-REFERENCE TO RELATED APPLICATION

This application is filed simultaneously with applicant's applications entitled 'Medical or emergency package and method of use thereof', and 'Unmanned aerial vehicle delivery system for delivery of medical or emergency' the whole contents of each of which are incorporated by reference.

INTRODUCTION

The following paragraphs are not an admission that anything discussed in them is prior art or part of the knowledge of persons skilled in the art.

Unmanned aerial vehicles (UAVs) have been coming into prominence and have been, in some situations, implemented at consumer levels. An obstacle to expanding the uses of UAVs has been public safety.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with a first aspect of the present disclosure, there is provided an unmanned aerial vehicle comprising: a body for carrying an article; at least one rotor (and the UAV may be a helicopter); and a light source for generating a light beam to define the pattern for a landing zone for the unmanned aerial vehicle.

In accordance with a second aspect of the present disclosure, there is provided a method of landing an unmanned aerial vehicle at a location, the method comprising:

providing an unmanned aerial vehicle comprising: a body for carrying an article; at least one rotor; and a light source for generating a light beam to indicate the landing zone for the unmanned aerial vehicle;

flying the unmanned aerial vehicle to a location;

causing the unmanned aerial vehicle to descend; and while the unmanned aerial vehicle is descending operating the light source to illuminate and to define the pattern for a landing zone.

BRIEF DESCRIPTION OF THE FIGURES

For a better understanding of the described embodiments and to show more clearly how they may be carried into effect, reference will now be made, by way of example, to the accompanying drawings in which:

FIGS. 3A, 3B and 3C are plan views, of landing zones defined by the UAV

DETAILED DESCRIPTION

Figure 1:
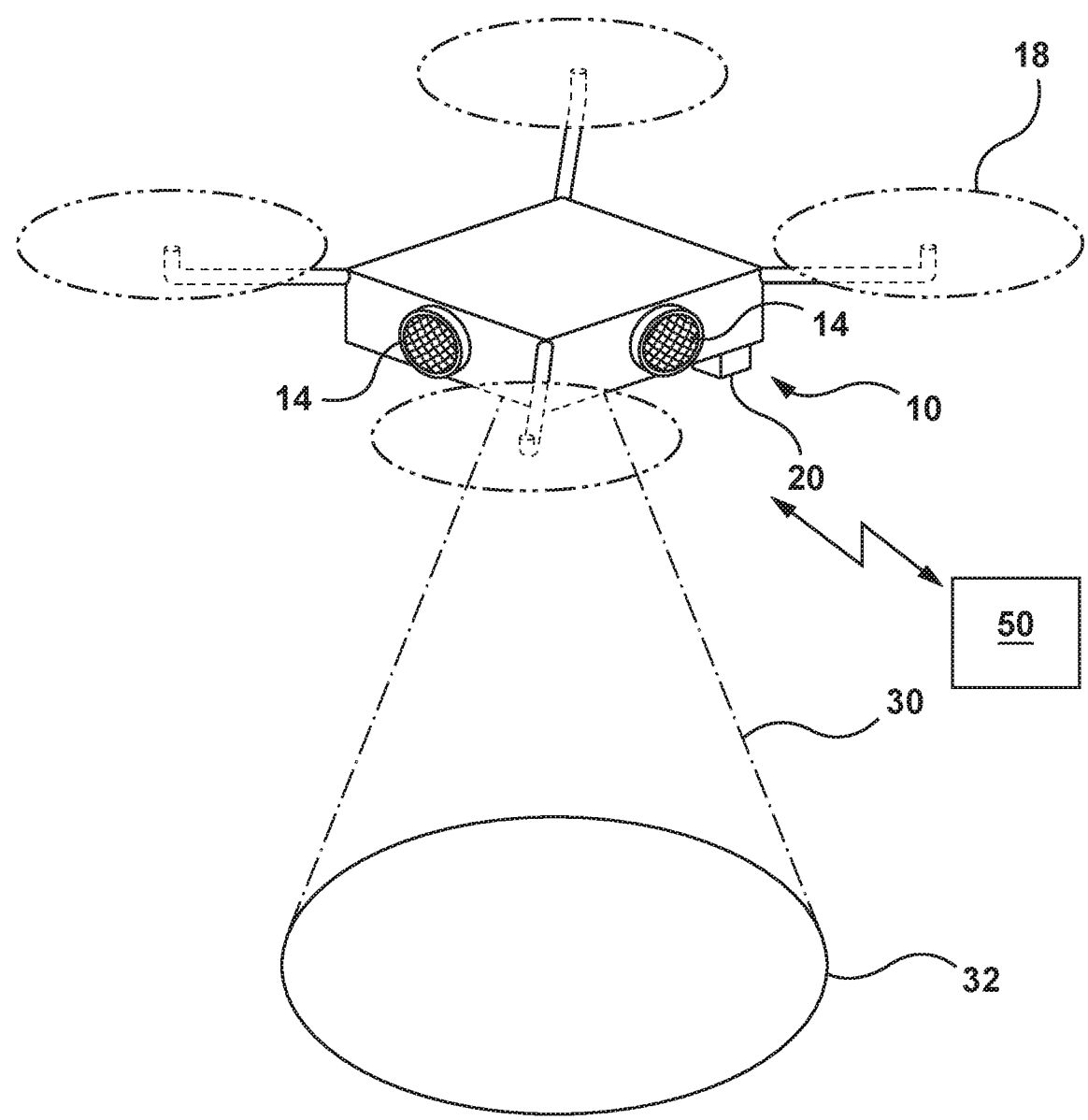
FIG. 1 is a schematic of an example Unmanned Aerial Vehicle (UAV) according to the present disclosure, and a landing zone.
Figure 2:
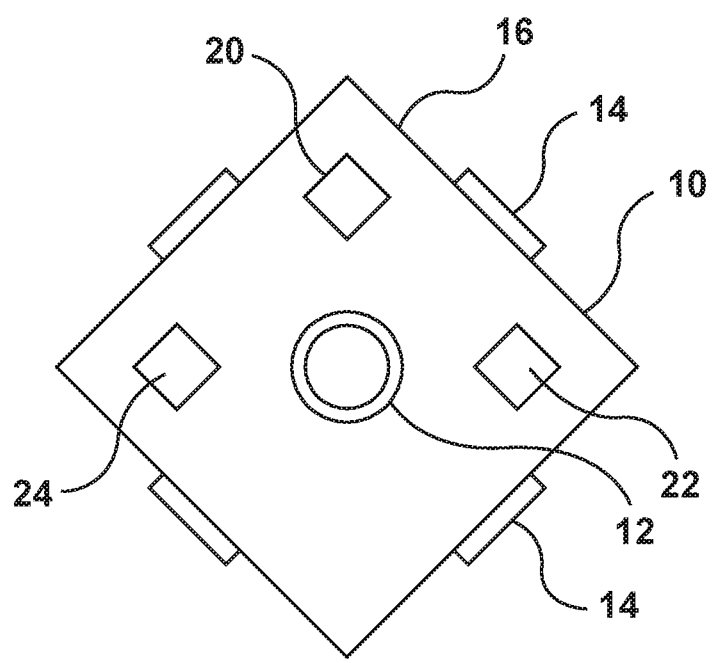
FIG. 2 shows a schematic of the underside of the Unmanned Aerial Vehicle (UAV) of FIG. 1.

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

UAV DELIVERY SYSTEM OVERVIEW. A general purpose unmanned aerial vehicle (UAV) delivery system, generally in accordance with Applicant's earlier application Ser. No. 15/331,147, the whole contents of which are incorporated by reference, provides a flight management system for delivering articles between a first party and a second party. The first and second parties may include customers of at least one UAV delivery service. Customers may include, for example, manufacturers, shippers, distributors, or other businesses, and also government agencies. In some cases, customers may have UAV zones at one or more locations, such as locations related to the customers' business(es). A UAV delivery service provider may operate such UAV zones and allow for customers to send delivery articles to and from each other by using UAVs flying between the UAV zones.

UAV zones may include features and functionality as described in U.S. patent application Ser. No. 15/299,923, the whole contents of which are incorporated into this document by reference. A computing system may be operable with the UAV zones to provide for UAV deliveries of articles between two or more UAV zones Where a package is to be sent by or for first responders, a UAV Zone may be provided at a first responder location, e.g. an ambulance, fire, or police station. It may also be provided at a community center. Alternatively, where such a UAV Zone is not available, or appropriate supply is not available at such a location, a first responders package could be delivered to a conventional UAV Zone as normally used for commercial purposes.

Where a delivery is to be made to other than a known UAV zone, it may be necessary to establish the exact location and coordinates for delivery. In some cases, this may be done by collecting GPS (Global Positioning System) data from mobile telephones or other GPS enabled devices at the location for the delivery. In other cases, it may be possible to provide devices, such as emergency beacons with known coordinates, for communicating information to the location from which a package is to be dispatched.

Where a delivery is made to a defined UAV zone, this can be configured to provide the required degree of security, and to ensure that there are no people, animals or inanimate objects that might interfere with or damage the UAV. Fixed wing UAVs will usually require an unimpeded landing strip of a minimum length. For multi and single rotor UAVS that can take off and land vertically, they will require an unimpeded area or zone that will not interfere with or damage the UAV, including the rotors.

Often, it is expected that a first responders package will be required to be delivered directly to a location where medical emergency has risen, which usually will not be at an established or defined UAV Zone. For example, it may be at the scene of a highway accident. There may be cases where first responders package, e.g. a rush delivery of a critical drug, will be required to be delivered to a location, such as a hospital, having an established UAV Zone.

Additionally, in the case of an emergency, there will often be many people at the scene or location. In many cases, people may be suffering from shock or trauma so as not act completely rationally. Accordingly, there is a requirement to provide for landing a UAV at an undefined location, such as an emergency or accident location, while ensuring that that the UAV is able to complete a mission or delivery without interference and damage.

Referring to FIG. 1, there is shown a UAV 10 in accordance with the present disclosure. The UAV 10 is shown as a quad copter, but it will be understood that the UAV may be any suitable UAV capable of vertical landing and taking off.

The UAV 10 is equipped with a light source 12 on the underside of the UAV 10 and is provided with speakers 14 on the sides thereof, with both the light source 10 and speakers 14 being mounted in a body 16 of the UAV 10. In known manner, the light source 12 and speakers 14 are connected and controlled by control circuitry (not shown). The UAV 10 includes a battery power source, connected to electric motors of rotors 18 and to the control circuitry. The control circuitry will be connected to antenna (not shown) for receiving radio control signals, for controlling operation of all aspects of the UAV 10.

The UAV 10 may include, and any combination, additional elements, for the purposes detailed below. These include a downwardly facing video camera 20 a motion sensor 22, and an infrared thermography sensor or camera 24. It may also include one or more lights 26, similar to emergency lights on an ambulance or fire truck, intended to get the attention of anyone close to the UAV 10.

The light source 12 is configured to provide a downwardly directed beam 30 that defines a required pattern 32 on the ground or other surface where the UAV 10 is to land.

FIGS. 3a, 3b and 3c show different patterns that may be displayed on the ground or other surface by the beam 30. FIG. 3a shows a circular pattern 34. The pattern 34 may include uniform illumination within the entire circle. Alternatively, the beam 30 can be, in effect, a hollow cone beam providing just light or illumination in an annular area 36 as indicated by the dotted lines in FIG. 3a. A variety of different patterns can be formed by the beam 30 from the light source 12. For example, as shown in FIG. 3b, a square or rectangular pattern 40 can be provided. Again, this can be with full illumination within the entire pattern 40 or just within a strip around the edge, as indicated at 42.

As shown, by way of further example, in FIG. 3c, a hexagonal pattern 44 could be provided. Again, illumination could be provided just in a strip around the edge of the pattern as indicated by the dashed lines 46.

The displayed pattern does not have to be a uniform or symmetrical geometric shape. For particular locations, irregular patterns can be displayed.

Taking the circular pattern of FIG. 3a as exemplary, it will be understood that, as shown, the beam 30 has a fixed cone angle. Accordingly, the diameter of the pattern 34 will depend upon both the cone angle and the height of the UAV 10 above the surface. As the UAV 10 descends, the diameter will progressively reduce. For many applications this may be adequate. As detailed below, for a set time, it may be sufficient to have the UAV 10 hover at a prescribed height, at which the pattern 34 will have an essentially fixed and known diameter, corresponding to the desired size for a landing zone, to provide an indication to bystanders of the landing zone.

An alternative arrangement would be to provide light source 12 with a means for adjusting the cone angle, so that this can be adjusted to maintain the diameter of the pattern 34 largely constant. The cone angle may be adjusted dependent upon a measured height of the UAV 10 above the surface.

In use, as the UAV 10 approaches an intended landing location, the light 12 can be turned on to illuminate the intended zone. At the same time, the video camera 20 and/or the infrared camera 24 can be turned on. The lights 26 may also be actuated, and/or warning sounds transmitted from the speakers 14, at this time, to gain the attention of anyone in the vicinity.

The approach of the UAV 10 to the landing zone may be monitored by a flight control Centre 50, shown as being in radio or wireless communication with the UAV 10. Personnel at the flight management system 50 located at a flight control centre may use the video camera 20, the motion sensor 22 and/or the infrared sensor or camera 24 to determine if the landing zone is clear. For example, these instruments should enable personnel to detect if there is any movement, indicative of the presence of humans or animals, and the Infrared sensor 24 may be able to detect the presence of humans or animals, even if not moving.

If the intended landing zone appears clear, the UAV 10 can proceed to descend. Assuming a light source with a fixed beam angle, at a height corresponding to the intended size for the landing zone, a message can be broadcast through the speakers 14, to the effect that: "an intended landing zone is now illuminated. Please stand clear." The speakers 14 may generally be used to broadcast warning messages or an emergency alarm sound, which may be similar to that used by other emergency vehicles, such as ambulances and fire trucks. As indicated, a broadcast verbal message may be to the effect that a drone or UAV is landing and everyone should stand clear.

LANDING IDENTIFIER. In a further aspect, one or more UAV zones may include a landing identifier 60. UAVs 10, may be operable with the flight management system 50 to identify a landing identifier 60 at least during an approach of a given UAV 10 to an intended UAV landing zone, and to land at or in proximity to the landing identifier 60. The landing identifier 60 may be any suitable identifier recognizable by UAVs 10 operable to identify and land at the identifier, either visually or through radio communication or otherwise. As the intended landing location may be anywhere, the landing identifier 60, will, usually, have to be provided separately. For example, first responder who are first on the scene of an accident or emergency, can be provided with portable landing identifiers 60. The first responders will be trained to identify suitable landing zones, e.g. areas that are free of obstructions horizontally and vertically, and to place the landing identifier 60 at the chosen location. The identifier 60 may then ensure that the UAV 10 does land at a correct intended location or landing zone.

Alternatively, for some destination locations, it may be preferred or possible to avoid landing the UAV 10. Instead, the UAV 10 may hover over the UAV zone at a destination, and lower a delivery article by a cable or the like. This can simplify the requirements of the landing zone at the destination, which then does not have to provide for an actual landing of the UAV, but only for landing of the delivery article. For this application, it may be desirable to use the light source 12, to indicate an area or zone that is to be kept clear while the UAV 10 delivers an article, e.g. medical supplies.

A UAV zone may be provided on a moving vehicle or otherwise be movable. For example, the vehicle could be a truck with a flat bed, a railway car, or on a ship. At least for delivery, the UAV 10 may not need to actually land, but could hover while an article is delivered by a cable or the like, as mentioned above. Where the UAV does not land, the camera 20 may be activated to film or photograph the delivery, as proof of delivery.

While the above description provides examples of one or more apparatuses or methods, it will be appreciated that other apparatuses or methods may be within the scope of the accompanying claims. Additionally, while certain combinations of features, elements and method steps are claimed in the accompanying claims, it is to be understood that any practical combination of these features, elements and method steps is envisaged and is part of the present disclosure.

The invention claimed is:

1. An unmanned aerial vehicle comprising: a body for carrying an article; at least one rotor; and a light source for generating a light beam to define a pattern for a landing zone for the unmanned aerial vehicle, wherein the light beam has a variable cone angle, whereby the landing zone indicated by the light source remains of substantially constant area, as the unmanned aerial vehicle the descends.

2. An unmanned aerial vehicle as claimed in claim 1, wherein the light source provides a solid beam.

3. An unmanned aerial vehicle as claimed in claim 1, wherein the light source provides a hollow cone beam.

4. An unmanned aerial vehicle as claimed in claim 1, 2 or 3, wherein the landing zone defined by the light beam is one of a circle, quadrilateral and a hexagon.

5. An unmanned aerial vehicle as claimed in claim 1, including at least one sensor to detect unwanted objects in the landing zone.

6. An unmanned aerial vehicle as claimed in claim 5, wherein the at least one sensor comprises at least one of a downwardly facing video camera, a motion sensor directed at the landing zone and an infrared thermography sensor or camera.

7. An unmanned aerial vehicle as claimed in claim 1, including at least one warning device for warning bystanders that the unmanned aerial vehicle will be landing.

8. An unmanned aerial vehicle as claimed in claim 7, wherein the warning device comprises at least one of the lights and an audio source.

9. An unmanned aerial vehicle as claimed in claim 8, wherein the audio source includes loudspeakers, for transmitting at least one of a warning sound and messages, optionally including an advisory message for bystanders to stay out of landing zone defined by the light source.

10. An unmanned aerial vehicle as claimed in claim 1, wherein the unmanned aerial vehicle includes a plurality of rotors.

11. A method of landing an unmanned aerial vehicle at a location, the method comprising:
providing an unmanned aerial vehicle comprising: a body for carrying an article; at least one rotor; and a light source for generating a light beam to indicate the landing zone for the unmanned aerial vehicle, wherein the light beam provides a variable cone angle;
flying the unmanned aerial vehicle to a location;
causing the unmanned aerial vehicle to descend; and
while the unmanned aerial vehicle is descending operating the light source to illuminate and to define a pattern for a landing zone, whereby the landing zone indicated by the light source remains of substantially constant area, as the unmanned aerial vehicle descends.

12. A method as claimed in claim 11, wherein the light source provides a solid beam.

13. A method as claimed in claim 11, wherein the light source provides a hollow cone beam.

14. A method as claimed in claim 11, wherein the light beam defines the landing zone as one of a circle, quadrilateral and a hexagon.

15. A method as claimed in claim 11, including detecting unwanted objects in the landing zone with at least one sensor.

16. A method as claimed in claim 15, wherein the at least one sensor comprises at least one of a downwardly facing video camera, a motion sensor directed at the landing zone and an infrared thermography sensor or camera.

17. A method as claimed in claim 11, including at least one warning to bystanders that the unmanned aerial vehicle will be landing with a warning device.

18. A method as claimed in claim 17, wherein the warning device comprises at least one of the lights and an audio source.

19. A method as claimed in claim 18, including transmitting at least one of a warning sound and messages, and optionally including transmitting an advisory message advising bystanders to stay out of the landing zone defined by the light source.

* * * * *